United States Patent
Werr et al.

(10) Patent No.: US 11,379,416 B1
(45) Date of Patent: Jul. 5, 2022

(54) SYSTEMS AND METHODS FOR COMMON DATA INGESTION

(71) Applicant: JPMorgan Chase Bank, N.A., New York, NY (US)

(72) Inventors: Emir Werr, New York, NY (US); Xiao Cong Liu, Jericho, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 471 days.

(21) Appl. No.: 15/459,374

(22) Filed: Mar. 15, 2017

Related U.S. Application Data

(60) Provisional application No. 62/309,679, filed on Mar. 17, 2016.

(51) Int. Cl.
| | |
|---|---|
| *G06F 16/00* | (2019.01) |
| *G06F 16/16* | (2019.01) |
| *G06F 16/11* | (2019.01) |
| *G06F 16/28* | (2019.01) |

(52) U.S. Cl.
CPC .......... *G06F 16/166* (2019.01); *G06F 16/113* (2019.01); *G06F 16/283* (2019.01)

(58) Field of Classification Search
CPC combination set(s) only.
See application file for complete search history.

(56) References Cited

U.S. PATENT DOCUMENTS

| | | | | |
|---|---|---|---|---|
| 7,054,892 | B1 * | 5/2006 | Phillips | G06F 11/1458 |
| 7,127,707 | B1 * | 10/2006 | Mishra | G06F 8/423 |
| | | | | 717/137 |
| 7,376,693 | B2 * | 5/2008 | Neiman | G06F 9/4843 |
| | | | | 709/201 |
| 7,437,739 | B1 * | 10/2008 | Hsieh | G06Q 10/06 |
| | | | | 719/328 |
| 7,565,414 | B1 * | 7/2009 | Love | G06F 21/6236 |
| | | | | 709/219 |
| 8,589,447 | B1 * | 11/2013 | Grunwald | G06F 16/182 |
| | | | | 707/797 |
| 9,256,467 | B1 * | 2/2016 | Singh | G06F 9/5005 |
| 9,317,577 | B2 * | 4/2016 | Duan | G06F 16/24554 |
| 9,563,486 | B1 * | 2/2017 | Narsude | G06F 9/541 |
| 9,632,892 | B1 * | 4/2017 | Sledz | G06F 16/178 |
| 10,015,106 | B1 * | 7/2018 | Florissi | G16B 20/00 |
| 2002/0184610 | A1 * | 12/2002 | Chong | G06F 8/20 |
| | | | | 717/109 |
| 2005/0114829 | A1 * | 5/2005 | Robin | G06Q 10/06 |
| | | | | 717/101 |
| 2005/0270855 | A1 * | 12/2005 | Earhart | G11B 27/327 |
| | | | | 365/189.05 |
| 2009/0193006 | A1 * | 7/2009 | Herrnstadt | G06F 16/283 |

(Continued)

*Primary Examiner* — Hafiz A Kassim
*Assistant Examiner* — Matheus Ribeiro Stivaletti
(74) *Attorney, Agent, or Firm* — Greenbebrg Traurig LLP

(57) ABSTRACT

Systems and methods for common data ingestion are disclosed. In one embodiment, in an information processing apparatus including at least a memory, a communication interface, and at least one computer processor, a method for common data ingestion may include (1) receiving a project registration for a project; (2) receiving project data associated with the project; (3) building a job associated with the project; (4) executing the job associated with the project; and (5) exporting the project data to at least one target.

13 Claims, 4 Drawing Sheets

(56) References Cited

U.S. PATENT DOCUMENTS

| | | | |
|---|---|---|---|
| 2009/0222643 A1* | 9/2009 | Chu | G06F 12/0246 711/209 |
| 2009/0254572 A1* | 10/2009 | Redlich | G06Q 10/06 |
| 2010/0042626 A1* | 2/2010 | Verma | G06F 16/1865 707/607 |
| 2010/0211737 A1* | 8/2010 | Flynn | G06F 12/0246 711/114 |
| 2012/0042060 A1* | 2/2012 | Jackowski | H04L 47/2475 709/224 |
| 2012/0059822 A1* | 3/2012 | Malandain | G06F 16/313 707/736 |
| 2013/0311222 A1* | 11/2013 | Chaturvedi | G06Q 10/06398 705/7.15 |
| 2014/0006597 A1* | 1/2014 | Ganguli | H04L 67/1014 709/224 |
| 2014/0172417 A1* | 6/2014 | Monk, II | G06F 17/2785 704/9 |
| 2014/0181006 A1* | 6/2014 | Greenwood | G06F 16/254 707/602 |
| 2014/0193047 A1* | 7/2014 | Grosz | G06Q 10/10 382/118 |
| 2014/0280593 A1* | 9/2014 | Versteyhe | G06Q 10/06 709/204 |
| 2015/0128204 A1* | 5/2015 | Lietz | H04L 63/0428 726/1 |
| 2015/0223023 A1* | 8/2015 | Das | G06F 3/04842 455/457 |
| 2015/0237139 A1* | 8/2015 | Chen | G06F 11/2053 709/217 |
| 2015/0242412 A1* | 8/2015 | Mathur | G06F 3/0649 707/665 |
| 2015/0262396 A1* | 9/2015 | Devarajan | G06F 3/0486 345/440.1 |
| 2015/0317083 A1* | 11/2015 | Phan | G06F 3/0608 711/103 |
| 2015/0378800 A1* | 12/2015 | Suzuki | G06F 3/0619 714/49 |
| 2016/0092496 A1* | 3/2016 | Dietterich | G06F 16/215 707/692 |
| 2016/0253340 A1* | 9/2016 | Barth | G06F 16/122 707/756 |
| 2016/0253352 A1* | 9/2016 | Kluck | H04L 67/1097 707/638 |
| 2016/0275162 A1* | 9/2016 | Jeon | G06F 16/278 |
| 2016/0342651 A1* | 11/2016 | Bendel | G06F 16/27 |
| 2017/0060972 A1* | 3/2017 | McHugh | G06F 16/258 |
| 2017/0091327 A1* | 3/2017 | Bostic | G06F 16/252 |
| 2017/0199770 A1* | 7/2017 | Peteva | G06F 9/5088 |
| 2018/0075393 A1* | 3/2018 | Lovell | G06Q 50/01 |
| 2019/0317949 A1* | 10/2019 | Florissi | G06F 16/27 |

* cited by examiner

SYSTEMS AND METHODS FOR COMMON DATA INGESTION

RELATED APPLICATIONS

This application claims priority to U.S. Provisional Patent Application Ser. No. 62/309,679, filed Mar. 17, 2016, the disclosure of which is hereby incorporated, by reference, in its entirety.

BACKGROUND OF THE INVENTION

1. Field of the Invention

The present invention generally relates to data processing, and, more specifically, to systems and methods for common data ingestion.

2. Description of the Related Art

Organizations receive data from many sources and of many different types. Processing this data is expensive, in both monetary cost and in man-hours.

SUMMARY OF THE INVENTION

Systems and methods for common data ingestion are disclosed. In one embodiment, in an information processing apparatus including at least a memory, a communication interface, and at least one computer processor, a method for common data ingestion may include (1) receiving a project registration for a project; (2) receiving project data associated with the project; (3) building a job associated with the project; (4) executing the job associated with the project; and (5) exporting the project data to at least one target.

In one embodiment, the project registration may include an application registration for an application associated with the project, a data registration for data associated with the project, and a job registration for a job associated with the project.

In one embodiment, the data registration may include a data domain registration, a dataset registration, and a data field registration.

In one embodiment, the job registration may include a service level agreement registration.

In one embodiment, the project registration may include an identification of a security policy for the project, a resource requirement for the project comprising at least one of a storage requirement and a processing requirement, etc.

In one embodiment, the method may further include determining a resource requirement for the project comprising at least one of a storage requirement and a processing requirement based on metadata received with the project data.

In one embodiment, the metadata may specify at least one of a number of concurrent jobs, a number of user connections, a number of files, and a data refresh interval.

In one embodiment, the project data may be received at a common drop zone, and the step of receiving project data associated with the project may include: the server associating a unique job identifier for each incoming file in the project data; renaming each incoming file with a name comprising a time stamp; and writing the renamed file to an archive.

In one embodiment, the step of receiving project data associated with the project may include identifying a personal information classification for the project data.

In one embodiment, the project data may be received at a common drop zone.

In one embodiment, the method may further include using a file watcher thread to monitor incoming data for at least one pattern.

In one embodiment, the method may further include storing the project data in a data reservoir.

In one embodiment, the data reservoir may include an archive data zone, a conformed data zone, and a semantic data zone. The archive data zone may store the project data in a format in which it was received. The conformed data zone may store reformatted project data in a common format.

BRIEF DESCRIPTION OF THE DRAWINGS

For a more complete understanding of the present invention, the objects and advantages thereof, reference is now made to the following descriptions taken in connection with the accompanying drawings in which.

DESCRIPTION OF PREFERRED EMBODIMENTS

Figure 1:
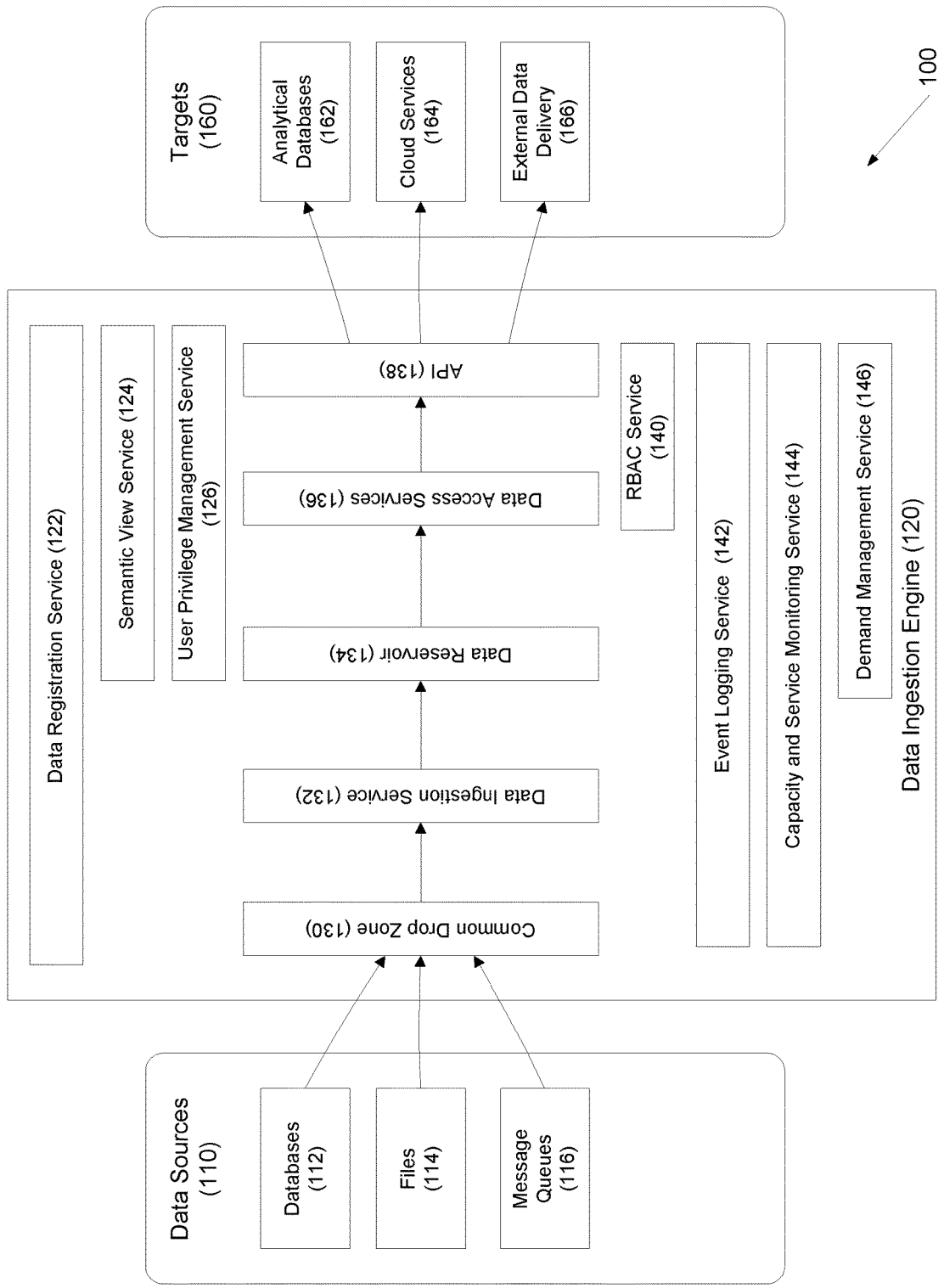
FIG. 1 depicts a data ecosystem according to one embodiment.

Systems and methods for common data ingestion are disclosed.

In one embodiment, data registration is the process which defines data domains, data sets, fields with respective structure, properties, and storage platforms within a Data Ecosystem. The process of registration may include metadata for security, user access control, personal identifiable information data classification, job management metadata that includes workload policies for job prioritization, service-level agreement ("SLA") configuration for job service level monitoring, escalation actions, data transformation actions, virtual data containers referred to as "zones", and/or runtime metadata that may be captured from system logging events and system profiling agents. The data registration may provide the metadata that may be used to integrate micro services into a functional end-to-end applications.

In one embodiment, data ingestion is a process that may be geared to obtain data from some resource, import it any format, and convert it to a common format to make it consistent and more easily accessible by downstream applications and users. In one embodiment, it may incorporate entire end-to-end system for data sourcing and storage. An architecture that may provide data ingestion may be streamlined and may standardize data orchestration for, for example, warehousing and analytical applications.

In one embodiment, the data ingestion system and method may enable an organization to, for example, implement the enterprise data lake using a standardized data registration and ingestion procedure. In addition, the on-boarding procedure may be a self-service process in using, for example, web registration application or programmatically using an AIP. Embodiments of the address key areas of data ingestion and dissemination, including, for example, data registration, data schema versioning, storage container registration, sensitive data classification, data delivery, data pre-processing and validation, data ingestion, data encryption, data compression, data storage, data access entitlements, data delivery SLA monitoring, storage container capacity monitoring, data processing workload management, data flow logging and data lineage integration.

In one embodiment, the system and method may also define a strategy and methodology for data provisioning (e.g., access to the data) and data re-ingestion lifecycle. For example, the system may automate data organization on Hadoop by using Hadoop Zone and Container partitioning.

In one embodiment, the system and method may create a data exchange for data providers and data consumers. Embodiments may include pre-configured zones that may be registered in a metadata structure, and each zone may include specific data processing attributes.

Data flows that may define attributes for the data source and the target data zone (e.g., a container) may be configured using, for example, a web-based admin tool. In one embodiment, a source may be mapped to several data zones.

In one embodiment, the association of source and target data zones may drive a series of built-in data operations.

In one embodiment, the system and method may employ automated data compression.

In one embodiment, the system and method may provide data archiving and retention lifecycle management.

In one embodiment, the system and method may provide data structure unification.

In one embodiment, the system and method may integrate data encryption for personal identifiable ("PI") data protection.

In one embodiment, the system and method may support one or more different service level agreements for data consumers and a variety of data integration methods.

In one embodiment, the system and method may employ a push delivery model. In another embodiment, the system and method may employ a pull delivery model. In still another embodiment, the system and method may employ a real-time delivery model.

Referring to FIG. 1, an exemplary architecture of a data ecosystem is disclosed according to one embodiment. System 100 may include sources 110, data ingestion engine 120, and targets 160.

Data sources 110 may include sources for data, including, for example, databases 112, files 114 (e.g., electronic documents), and message queues 116 (e.g., e-mails, instant messages, etc.). Other sources for data may be used as necessary and/or desired.

Data ingestion engine 120 may include data registration service 122, semantic view service 124, user privilege management service 126, drop zone 130, data ingestion service 132, data reservoir 134, data access services 136, one or more application programmable interface ("API") 138, role-based access control ("RBAC") 140, event logging 142, capacity and service monitoring 144, and demand management 146.

In one embodiment, data registration service 122 may register incoming data. In one embodiment, this may involve receiving system requirements for the application and/or data, such as memory and/or storage requirements, processing requirements, etc. In another embodiment, data registration service 122 may forecast these requirements. For example, incoming data may include a source file name pattern that is pre-configured and may be used, for example, to trigger an inbound data processing job.

In one embodiment, semantic view service 124 may provide users and/or applications logical access to data using the data registration as the logical to physical data mapping.

In one embodiment, zone registration definitions may be used to logically map physical data platforms. This may include, for example, connection details, technology type, authentication method, access method, etc. The semantic view service may function as a data access proxy layer abstracting data producers and data consumers from underlying technology.

In one embodiment, user privilege management service 126 may establish a privilege level to access the data. It may also provide PII data handling through PII data sensitivity classification, user privilege policy, and encryption/masking policy.

In one embodiment, drop zone 130 may include one or more landing zone for registered data. It may be implemented using, for example, a HDFS NFS Gateway. In one embodiment, data may be registered to auto-enable the data ingestion process.

Data ingestion service 132 may spawn multiple File Watcher Threads, and each thread may monitoring a dedicated number of inbound patterns for corresponding data.

In one embodiment, data ingestion service 132 may be a Java agent that may capture a list of all active inbound patterns or real-time messages to ingest. The data ingestion service may use metadata (e.g., data mapping and/or zone registration information) to automate the data ingestion activity. In one embodiment, the data ingestion service may call a user defined (e.g., a custom) data processor during the automated data ingestion flow. The data ingestion procedure may be configuration driven through the registration procedure. By changing the registration metadata, the data ingestion service may alter data source, data destination and data processing logic.

In one embodiment, a data ingestion worker thread may be used for each inbound file archive operation into data reservoir 134. For each file, a unique job identifier may be generated, and the inbound data file may be immediately renamed with a time stamp to avoid inbound file collisions and overwrites, and to preserve file arrival time sequence. The inbound file may be read from landing zone 130 and written to an archive zone.

In one embodiment, data reservoir 134 may be logically and physically partitioned into a plurality of data zones including, for example, archive data zone, conformed data zone, and semantic data zone. The number and type of data zones may be determined as is necessary and/or desired.

The archive data zone may store raw "untouched" data that flows inbound to data ingestion service from different systems.

The conformed data zone may store reformatted data to create a consistent readable format to facilitate simplified access to the data. In one embodiment, the conformed data zone may also serve as input for the semantic data zone. The data in the conformed data zone may be stored in, for example, a Hadoop file system, which may provide scalability and higher performance data processing.

In one embodiment, the semantic data zone may be derived from the conformed data zone and may be stored on the same physical server cluster, or a different physical server. In one embodiment, it may use a different technology. The semantic data zone may be used to store business friendly data that may contain derived, aggregated, denormalized information that is easy to access using conventional BI applications or reporting tools. A logical data schema for the semantic data zone may be used to query the information using business terms for datasets and fields.

The zone registration process described herein may provide the metadata for the underlying data platform. In general, data reservoir 134 may all reside on a single Hadoop cluster, multiple Hadoop clusters (federated), or a combination of Hadoop and other fit-for-purpose data platform such as Cassandra. Data reservoir 134 may be considered as a "logical" and well organized data store with a system catalog.

Data access services 136 may permit access to data that may be stored in data reservoir 134. In one embodiment, data access services 136 may encrypt and decrypt sensitive classified data, PII, depending on user privilege policy and data protection policy.

Application programmable interface, or API, 138 may provide an interface with targets 160.

In one embodiment, Role Based Access Control (RBAC) service 140 may be used for data access authorization. RBAC service 140 may verify that the person or application attempting to access the data is entitled to access that data based on his or her role. The data access services and data ingestion services may request, from RBAC service 140, authorization for data access.

Event logging service 142 may generate and maintain a log of events involving data ingestion engine 120.

Capacity and service monitoring service 144 may monitor the capacity of storage (e.g., local and/or cloud-based storage), processor utilization, etc.

Demand management service 146 may be used for workload management and load balancing. Workload management may consistent of job queuing, throttling, prioritization, dispatching, and termination. Demand management service 146 may be used to collect statics from the underlying systems that are being utilized in order to make runtime decisions for the execution of jobs.

Targets 160 may include one or more target for the ingested data including, for example, analytical databases 162, cloud services 164, and external data delivery 166.

In one embodiment, data may be received from one or more data source 110 into common drop zones 130. It may then be processed by data ingestion services 132 and stored in data reservoir 134. The data in data reservoir 134 may be accessed by one or more of target 160 using one or more API 138.

Figure 2:
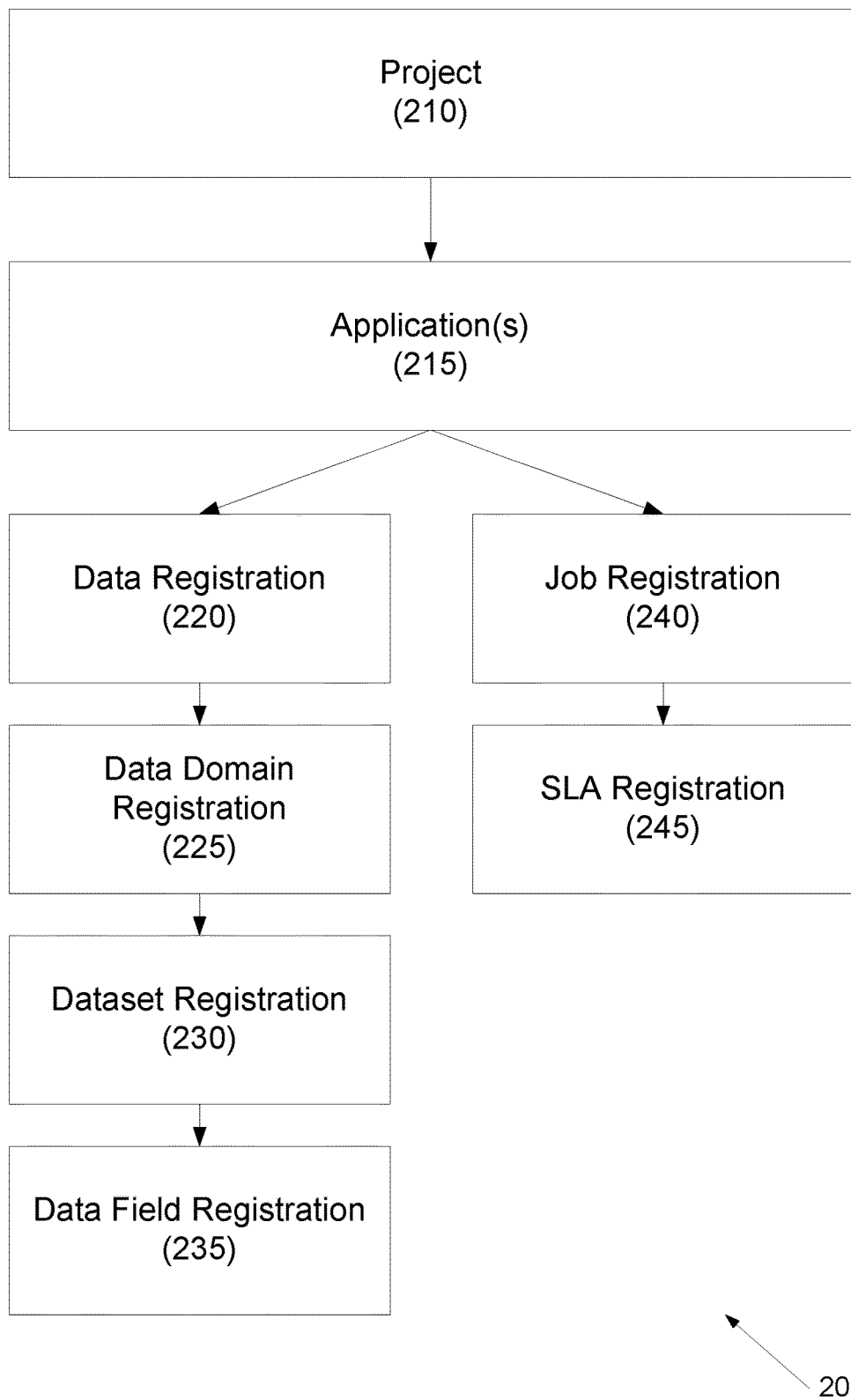
FIG. 2 depicts a registration hierarchy for a project according to one embodiment.

Referring to FIG. 2, a registration hierarchy is provided according to one embodiment. Registration hierarchy 200 for project 210 may include application(s) 1215, data registration 220, data domain registration 225, dataset registration 230, data field registration 235, job registration 240, and SLA registration 245. For example, project 210 may be associated with one or more application(s) 215. Each application 215 may have data registration 220 for the data associated with project 215. This may involve the registration of the data domain 225, registration of the dataset 230, and registration of the data field 235.

Each application 215 may further have one or more job registration 240, and each job may have a SLA registration 245 that may establish the service levels associated with the job.

Figure 3:
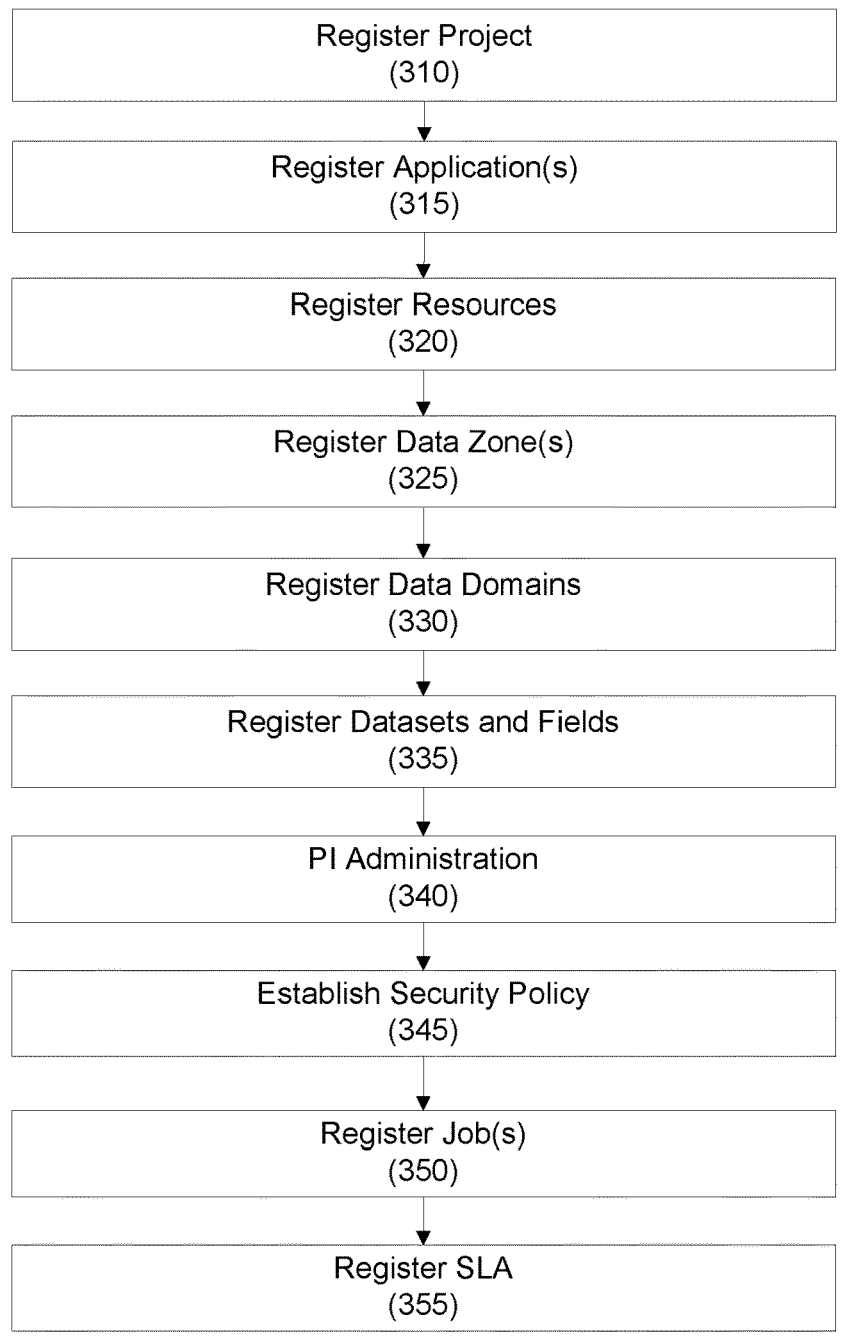
FIG. 3 depicts a method for project registration according to one embodiment.

Referring to FIG. 3, exemplary method for registration 300 is disclosed according to one embodiment.

In step 310, one or more projects may be registered. In one embodiment, a project may be submitted by a requester, and may be approved manually and/or automatically to be registered.

In one embodiment, the registration process may include determining system requirements (e.g., CPU, storage, etc.) required by the project. In one embodiment, project registration may be used for other metrics like concurrent jobs, user connections, files, data refresh interval, and other metadata that is used for approximating the aggregated demand for the system. In one embodiment, project registration may provide information about ownership, line of business, chargeback cost center, business description, and escalation procedure.

In step 315, one or more applications may be registered. In one embodiment, a project may have one or more applications that it services, and these constituent applications may be registered.

In one embodiment, as part of the registration process, the user may provide system requirements for the application. For example, the user may provide memory and/or storage requirements, processing requirements, etc. In another embodiment, the system may forecast these requirements.

In one embodiment, the requirements may also be used to estimate a cost for the application.

In one embodiment, application registration may provide metadata about the system that is publishing or consuming data from the data reservoir. The metadata may include a unique application identifier, contact accounts, escalation queue identifier, default SLA policy, and default workload management priority. The application registration may be used as a logical grouping of jobs.

In step 320, one or more resource may be registered. In one embodiment, a resource may define the physical container that data needs to be transmitted to or acquired from. It may further define a service that may be used to connect to the container.

In step 325, one or more data zone may be registered. In one embodiment, a zone may define guidelines for the data being stored in a particular logical layer of the data reservoir. In one embodiment, the guidelines may identify technical characteristics of the data being stored in the zone, such as data format, retention settings, compression, etc. In addition, the zone may further defines transformation rules for the content of the data being stored (e.g., should the data being stored be as-is, can it be aggregated, etc.).

In one embodiment, a zone may be defined by a system administrator and may create a layer of abstraction over the underlying resource connectivity. It may also be used to switch between containers efficiently and transparently.

In one embodiment, zone definitions may be used to store information about the functional application account and corresponding authentication method, such as Kerberos, Password, LDAP, EPV-AIM Credentials, Token, etc. In one embodiment, the zone registration may store a data retention period that may be used to automatically purge data when the storage of data exceeds the data retention policy for the respective zone. The zone registration may also store the default compression type that is used by data ingestion and data access services, encryption key secret and salt that may be used to encrypt data when it is persisted in the data zone.

In step 330, one or more data domains may be registered. In one embodiment, a data domain may be a namespace for a particular set of data objects that are transmitted to or from the data ecosystem. An example of a data domain is a System of Record that transmits one or many file structures to HDFS.

A data domain may contain important information about the data domain, including specification of the ownership of the data, Peregrine Queue, responsible entity, etc. These properties may be utilized when servicing data domain requests such as escalations, security requests, etc.

In step 335, datasets and fields may be registered. A dataset may represent a source of data that resides or will reside in the Data Reservoir. A dataset may specify properties of data, including its source format, source and target locations, escalation resources, technical parsing properties, structure, etc. This may enable operations on data, such as parsing the incoming data (file/table), performing logical operations on the data, escalating issues, etc.

Examples of dataset registration types include file registrations (e.g., light, full, complex), table registrations, directory registrations, and message queue registrations. The light registration may be used for file-level configuration that does not require field-level schema mapping. The full registration may be used to configure dataset and corresponding field definitions. The complex registration may be used to configure dataset and column family definitions that used for nested or hierarchical data structures. Table registrations may be used to map to existing database systems where data is sourced and/or ingested directly from those systems. Directory registration may be used to store the directory hierarchy for data ingestion services and data access services.

In one embodiment, a file system directory and its contents may be tarred and compressed and then sent to the file drop zone for data ingestion into the data reservoir. The data may then be stored, and the logical directory structured may be stored as metadata in a data reservoir system catalog. In one embodiment, this data may be used by data access services.

In one embodiment, a file type registration may identify the incoming source for that dataset as a file. A file type registration may have one or more subcategory, such as light, full, and ABI. For example, a file light type registration may be used for easy archiving of files in the data reservoir, as these files may not have an associated structure. This registration generally rapidly stores and retrieves data in the ecosystem, without performing any field level parsing. An example use case is storing data for compliance reasons.

File full type registration may use a data ingestor to ingest a file based on a defined structure.

File complex type registration may be used to register structured datasets that need to go through extract, transform, and load ("ETL") processing. The complex type registration may include, for example, processor type, location that it needs to invoke during the data pre-processing or post-processing step, etc. Different processors and/or ETL tools, such as Ab Initio, Informatica, Talend, Pentaho, etc., may be used.

Table type registration may be used to register and ingest tables from a source database in the data reservoir. For example, based on the source resource details and, the schema, and dataset selected by user during registration, the table structure from the source tables may be imported into the target zone.

Directory type registration may enable a user to identify data that will be stored in a specific directory path in the target resource, during ingestion.

In step 340, personal information ("PI") may be administered. In one embodiment, all structured files may be processed by PI administration. For example, after file has been successfully registered, a data modeler may identify the PI fields in the data.

In one embodiment, this may include the following the identification of field sensitivity level, such as confidential and highly confidential. This may be referred to as "PI Classification." The classification codes may be maintained and provided by a data security organization. The function of classifying PI data elements may be restricted.

Following PI classification, PI Approval is performed. In one embodiment, a different privileged account may review and approve the PI classifications. The PI approver may reject the classification which may return the workflow back to the PI classifier. In one embodiment, the approval of PI classifications may activate the dataset registration. Once the data registration is active the data may be ingested and accessed by the services. In one embodiment, an inactive data registration may appears invisible to the underlying system for use.

In one embodiment, the PI classification and approval workflow may also provide auditability and data governance.

In one embodiment, one or more utility may be used to perform automated bulk classification of PI data. In one embodiment, the PI classifier may use a utility program that imports a csv formatted file that contains data registration and PI classification codes. This may be used to automate and speed up the function of PI classification.

In one embodiment, once the PI classification is complete, a business user (e.g., a data steward) may provide approvals for the PI classifications made.

In step 345, one or more data security policy may be established. In one embodiment, a data security policy may enable the amalgamation of data objects from multiple registered sources (e.g., Data Domain, Datasets, Fields) into a single security policy. Users may request access to data policy to obtain access to all its component data objects.

In one embodiment, write security group for datasets may be provided during dataset registration. In one embodiment, users in a specified group may write to the dataset.

In step 350, one or more jobs may be registered. In one embodiment, traceability may be maintained by logging jobs in job logging tables for ingestion. In one embodiment, user defined job definitions In one embodiment, a logical group may be defined for an application's jobs. A job group then contains one or more jobs which may represent an end to end process. A job may be further divided into job steps which may represent individual units of work needed to complete the job process. A generic job step may be logged by the end user process through, for example, a job logging API.

In one embodiment, jobs and job steps may be tracked in the dashboard.

In one embodiment, a job registration may be used to store a priority identifier for workload management. The priority identifier may be used to during the execution of a job and to prioritize a higher priority job over a lower priority job. The job registration may be used to store the processor identifier that may be used to fetch configuration metadata for job execution. This configuration may include, for example, the location of the executable service or program, parameters, and invocation method for running a user defined procedure ("UDP") or custom program.

In step 355, one or more SLA may be registered. In one embodiment, a SLA may be defined and associated with a generic job step definition. In one embodiment, a SLA may be associated with a single job step, and vice-versa.

In one embodiment, the SLA may be a type of policy for defining standard expectation of corresponding operation. The SLA may define the acceptable time for the respective Job or a step within the Job. This may be used by the SLA monitoring service to automate the notifications and action whenever SLA is missed. This may be used to generate a Quality of Service ("QOS") report.

Figure 4:
FIG. 4 depicts a method for data processing according to one embodiment.

Referring to FIG. 4, a method for data processing is disclosed according to one embodiment.

In step 410, data may be onboarded. In one embodiment, this may involve identifying the source data, defining the mapping of the source data, defining the protection and encryption of the data, identifying the zones for the data, and identifying access control to the data.

In one embodiment, during data onboarding and/or job management/data processing, one or more "snapshot" of the metadata may be taken. In one embodiment, the snapshot may include one or more of the zone, structure, mapping, sensitivity, execution method, etc.

In step 415, job(s) may be built. In one embodiment, jobs may be built by information technologists. Jobs may be built, for example, using common application integration platform (CAIP) (e.g., CAIP read/CAIP write), an enterprise scheduler to schedule jobs, etc.

In step 420, scheduled jobs may be executed. In one embodiment, this may include executing the jobs built. In one embodiment, services may be invoked, such as File Watcher, SLA monitoring, etc. Job execution may be automatically orchestrated, and the flow may be configuration-driven. For example, the configuration may be dynamically generated from the data registration information that may be stored in the meta store.

In step 425, reporting may be performed. In one embodiment, this may involve reporting status, escalating issues, reporting metrics, SLA issues, chargeback, etc.

In step 430, data consumption and/or data discovery may be performed. In one embodiment, this may include provisioning data, searching data, indexing metadata, etc.

In step 435, data may be accessed. In one embodiment, the ways in which data is accessed may be defined. Common interfaces may be defined; data may be encrypted and/or decrypted; metrics may be provided; data may be accessed from zone; access to data may be authorized; etc. In one embodiment, access to data may be audited.

An example architecture of a data ingestion and access with hybrid cloud data integration according to one embodiment is provided below:

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for common data ingestion comprising:

in an information processing apparatus including at least a memory, a communication interface, and at least one computer processor:

registering a project comprising a plurality of project data files, each project data file having a project data characteristic and a source file name that adheres to a predefined pattern;

registering a plurality of data zones in a data reservoir for receiving project data files associated with the project, each data zone associated with a different data characteristic, wherein the data characteristic includes a data format, a retention setting, and a compression state, and wherein registering the plurality of data zones comprises generating, for each zone, a logical to physical data map for a physical data platform;

receiving the project data files associated with the project into a common drop zone;

instantiating a plurality of file-watcher threads at a data ingestion service of the processing apparatus, wherein each of the file-watcher threads is configured to monitor for a corresponding pattern;

monitoring, by one file watcher thread of the plurality of file-watcher threads, for incoming data from the common drop zone that is associated with the predefined pattern;

determining, by the one file-watcher thread of the plurality of file watcher threads, that the project data files are associated with the predefined pattern;

triggering a predefined data processing job of the project data files based on the determining that the project data files are associated with the predefined pattern, wherein the predefined data processing job includes:

identifying a personal information classification for each of the project data files, wherein the personal information classification is one of a first-level confidential field sensitivity level or a second-level field sensitivity level;

performing an approval process based on the personal information classification;

responsive to an approval based on the approval process, establishing a security policy for each project data file;

routing each project data file from the common drop zone to one of the data zones based on the project data characteristic and the data characteristic for each data zone; and exporting the project data to at least one target.

2. The method of claim 1, wherein the project registration comprises a service level agreement registration.

3. The method of claim 1, wherein the project registration further comprises an identification of a security policy for the project.

4. The method of claim 1, wherein the step of routing each project data file from the common drop zone to one of the data zones based on the project data characteristic and the data characteristic for each data zone comprises:

associating a unique job identifier for each incoming project data file;

renaming each incoming project data file with a name comprising a time stamp; and writing the renamed file to an archive data zone.

5. The method of claim 1, wherein the data zones comprise an archive data zone, a conformed data zone, and a semantic data zone.

6. The method of claim 5, wherein the conformed data zone stores reformatted project data in a common format.

7. The method of claim 1, wherein each data zone is associated with a data retention period.

8. The method of claim 1, wherein each data zone is further associated with a data transformation rule.

9. The method of claim 8, wherein the transformation rule specifies a data compression rule.

10. The method of claim 1, further comprising:

determining system resource requirements for the project.

11. The method of claim 10, wherein the system resource requirements comprise at least one of a storage requirement and a processing requirement for the project.

12. The method of claim 10, further comprising determining the system resource requirements for the project based on metadata received with the project data.

13. The method of claim 12, wherein the metadata specifies at least one of a number of concurrent jobs, a number of user connections, a number of files, and a data refresh interval.

* * * * *